United States Patent [19]

Adams

[11] Patent Number: 5,892,935

[45] Date of Patent: Apr. 6, 1999

[54] DATA PRE-FETCH FOR SCRIPT-BASED MULTIMEDIA SYSTEMS

[75] Inventor: Robert Adams, Lake Oswego, Oreg.

[73] Assignee: Intel Corporation, Santa Clara, Calif.

[21] Appl. No.: 695,881

[22] Filed: Aug. 12, 1996

Related U.S. Application Data

[62] Division of Ser. No. 268,458, Jun. 30, 1994, abandoned.

[51] Int. Cl.$^6$ ..................................................... G06F 17/30
[52] U.S. Cl. .................... 395/383; 395/708; 395/200.09; 395/615
[58] Field of Search .................................... 395/500, 464, 395/460, 425, 375, 381, 382, 383, 601, 610, 611, 612, 613, 615, 701, 704, 706, 708, 200.09; 364/262.4

[56] References Cited

U.S. PATENT DOCUMENTS 5,050,068  9/1991  Dollas et al. ............................ 395/375

OTHER PUBLICATIONS

Computer, vol. 26, No. 3, 1, Mar. 1993, pp. 44–53, XP 000364310, Staehli, R., et al., "Constrained–Latency Storage Access".

Foundations of Data Organization and Algorithms. 4th International Conference. Fodo '93 Proceedings, Chicago, IL, USA, 13–15 Oct. 1993, ISBN 3–540–57301–1, 1993, Berlin, Germany, Springer–Verlag, Germany, pp. 1–18, Maier, D., et al., "Storage System Architectures for Continuous Media Data".

Proceedings of the International Conference on Multimedia Computer and Systems (Cat. No. 94TH0631–2), Proceedings of IEEE International Conference on Multimedia Computer and Systems, Boston, MA, USA, 15–19 May 1994, ISBN 0–8186–5530–5, 1994, Los Alamitos, CA USA, IEEE Comput. Soc. Press, USA, pp. 224–233, Rubine, D., et al., "Low–Latency Interaction Through Choice–Points, Buffering, and Cuts in Tactus".

Conn et al., *4 DOS*, JP Software Inc, East Arlington, MA 02174, 1989, p. 97.

*Primary Examiner*—Kevin J. Teska
*Assistant Examiner*—Russell W. Frejd
*Attorney, Agent, or Firm*—William H. Murray; N. Stephen Kinsella

[57] ABSTRACT

A multimedia architecture for pre-fetching data from a server provides limited-memory client machines with the ability to take advantage of a large remote database with relatively quick response time. A compiler program analyzes a given script to determine what data is needed by the current script and what potential scripts might be addressed from the current script and what server-stored data those scripts would need. That data is pre-fetched from the server upon commands from the compiler program in order to be quickly available for display at the client machine if requested by a user.

21 Claims, 2 Drawing Sheets

5,892,935

DATA PRE-FETCH FOR SCRIPT-BASED MULTIMEDIA SYSTEMS

"This is a divisional of application(s) Ser. No. 08/268,458 filed on Jun. 30, 1994", now abandoned.

BACKGROUND OF THE INVENTION

This invention relates to multimedia systems, and more particularly to script-based client-server systems with remote storage of the main database. A main object of client-server systems is to provide limited-memory client machines (e.g. personal computers) with access to a voluminous database stored in a central server. The link between the server and the client machines is commonly accomplished by means of a single data line by employing time division multiplexing with the on-line client machines.

Generally, with such an arrangement, when a client machine requests server-stored data there results a passage of a significant "click-wait-watch" time period while the server proceeds to transmit the desired data to the client machines's local memory along a limited-bandwidth (i.e. relatively slow) information channel. With many multimedia applications, this slow response time renders the application significantly less useful (and in some cases unworkable).

This problem has been a major obstacle to efficient use of the client-server technique to advanced multimedia applications.

It is therefore an object of the instant invention to reduce the latency period for client receipt of requested information in client-server multimedia environments.

It is a further object of the instant invention to supply only the currently potentially-needed data to the client machine just in time upon request.

It is yet a further object of the instant invention to provide a script-analyzing compiler program that controls the pre-fetching of data in accordance with specific applications' script routines.

SUMMARY OF THE INVENTION

Applicant has developed a novel architecture for providing quick response time in a script-based multimedia client-server system. The client machines (e.g. PCs) employ a hierarchial multimedia script language which is used to describe a decision tree wherein each of the decision points, i.e. "nodes," have several other nodes to which they can proceed depending on the user's input. Once a particular node is chosen, multiple possible ensuing choices are made available to the user. The necessary data for these possible choices is pre-fetched automatically by a runtime processor that determines what data might be needed based on the user's current script node location as signaled to the runtime processor by the compiler. Just this potentially immediately-useful prefetched data is stored temporarily in a local "run time data requirement" memory (e.g. a special harddisk file). The compiler program is specially designed to analyze the script code to accomplish the suitable pre-fetching, so that a script language application programmer can do the programming as usual, and does not need to make any special pre-fetch requests in the script code. There is no interference with the normal operation of the scripting language. In this manner the click-wait-watch times in the application program are minimized, thus allowing limited machine memory PC users connected to the large memory server to take advantage of advanced multimedia applications that were previously practically realizable only in conjunction with large memory machines.

BRIEF DESCRIPTION OF THE DRAWING

The reader's understanding of a practical implementation of a preferred embodiment of the instant invention will be enhanced by reference to the following detailed description taken in conjunction with the drawing figures, wherein.

DETAILED DESCRIPTION OF A PREFERRED EMBODIMENT

Figure 1:
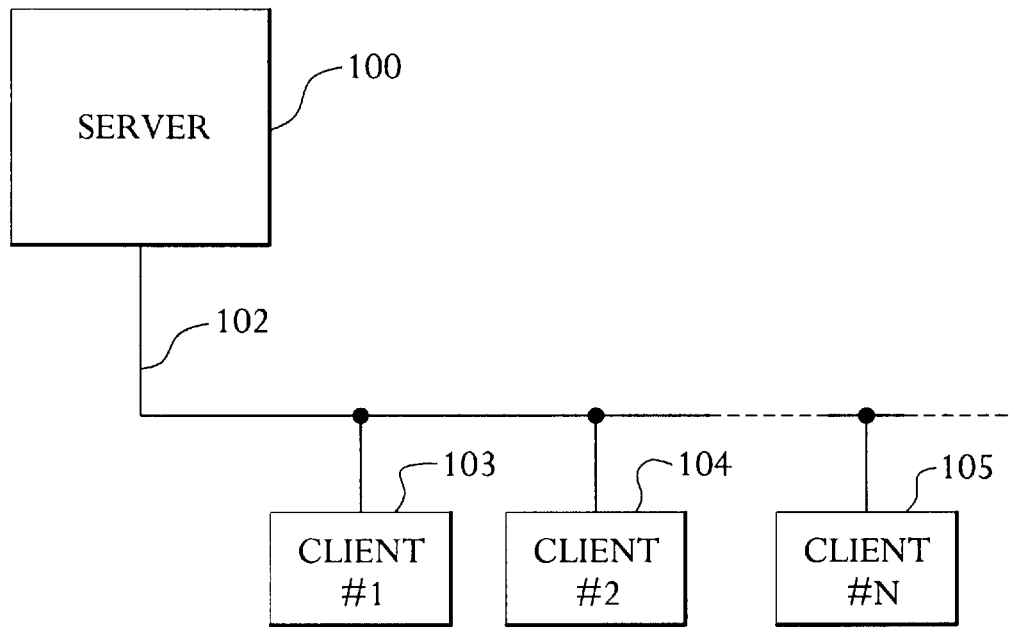
FIG. 1 depicts a client-server information exchange system.

Referring now to FIG. 1, therein depicted is a client-server system for providing remote limited-memory client machines 103–105, etc. (which are typically personal computers) with access to the extensive memory and database of a server 100 via communications channel 102. The communication channel can be a coaxial cable, a fibre optics cable, a microwave data link, or other similar link. This simple architecture is useful for some purposes, but in certain applications it is cumbersome, if not useless, due to the relatively long time delays (i.e. "click-wait-watch" time) involved in procuring the server-stored data.

In multimedia applications involving a "scripting" language it is desirable and often practically essential to keep all system delays to a minimum. Applications with long delays are simply not highly useful or marketable.

Figure 2:
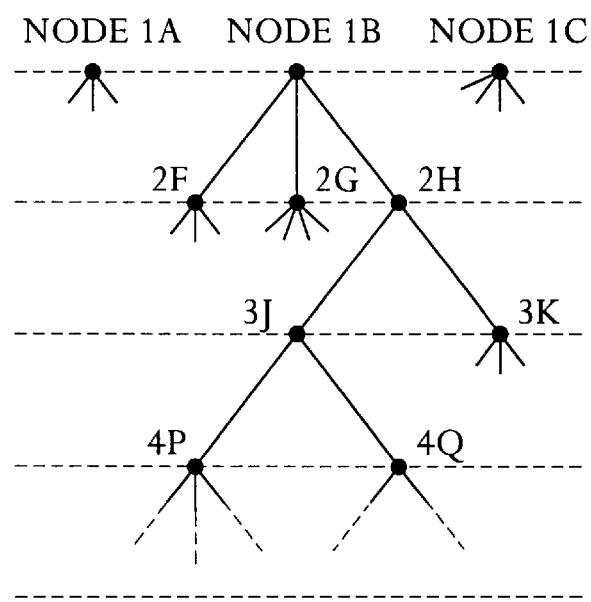
FIG. 2 shows schematically a layered multimedia script selection tree.

The instant invention addresses this problem in a novel way that can be better appreciated by reference to FIG. 2. Therein depicted are various nodes of a scripting selection scheme. When a user selects an option, e.g. Node 1B, additional options become available to that user, e.g. Nodes 2F, 2G, and 2H. Each of these nodes in turn have further multiple options, and so on as shown.

Once an initial option is chosen, options for each ensuing layer are inherently contained in the script program. So, within the script program resides the information necessary to determine what immediate future selections are possible once the user has chosen a given node. The instant invention comprises taking advantage of this inherent information in the script program by means of a specialized compiler program that analyses the script program and determines automatically what the potential immediate user options are at any given currently-selected node. This information is used by the runtime processor to immediately pre-fetch any potentially needed data from the server prior to an actual request by the user for particular data.

For example, once the user has chosen Node 2H in the script selections, any data required from the server to fulfill the requirements of both Nodes 3J and 3K is automatically prefetched from the server (in response to the commands of the compiler) and locally-stored temporarily for potential near-future use. In this regard, this specialized pre-fetch arrangement is somewhat akin, in principle, to a "just in time" parts delivery system for a manufacturing assembly line for customized products. The object is to have the system work "on the fly" as readily as possible without undue (or impossible) local storage.

It should be noted that the technique of the instant invention typically involves more data being transferred from the server to the client in a given time period than would otherwise occur. This is due to the fact that a significant portion of the data for all the potential choices is transmitted even though only a fraction of it will actually be used. Therefore, a practical implementation of the instant invention can sometimes require an increased bandwidth data channel between the server and clients beyond what would otherwise be necessary. Nonetheless, at least from the user's standpoint, this is an acceptable and desirable tradeoff.

Figure 3:
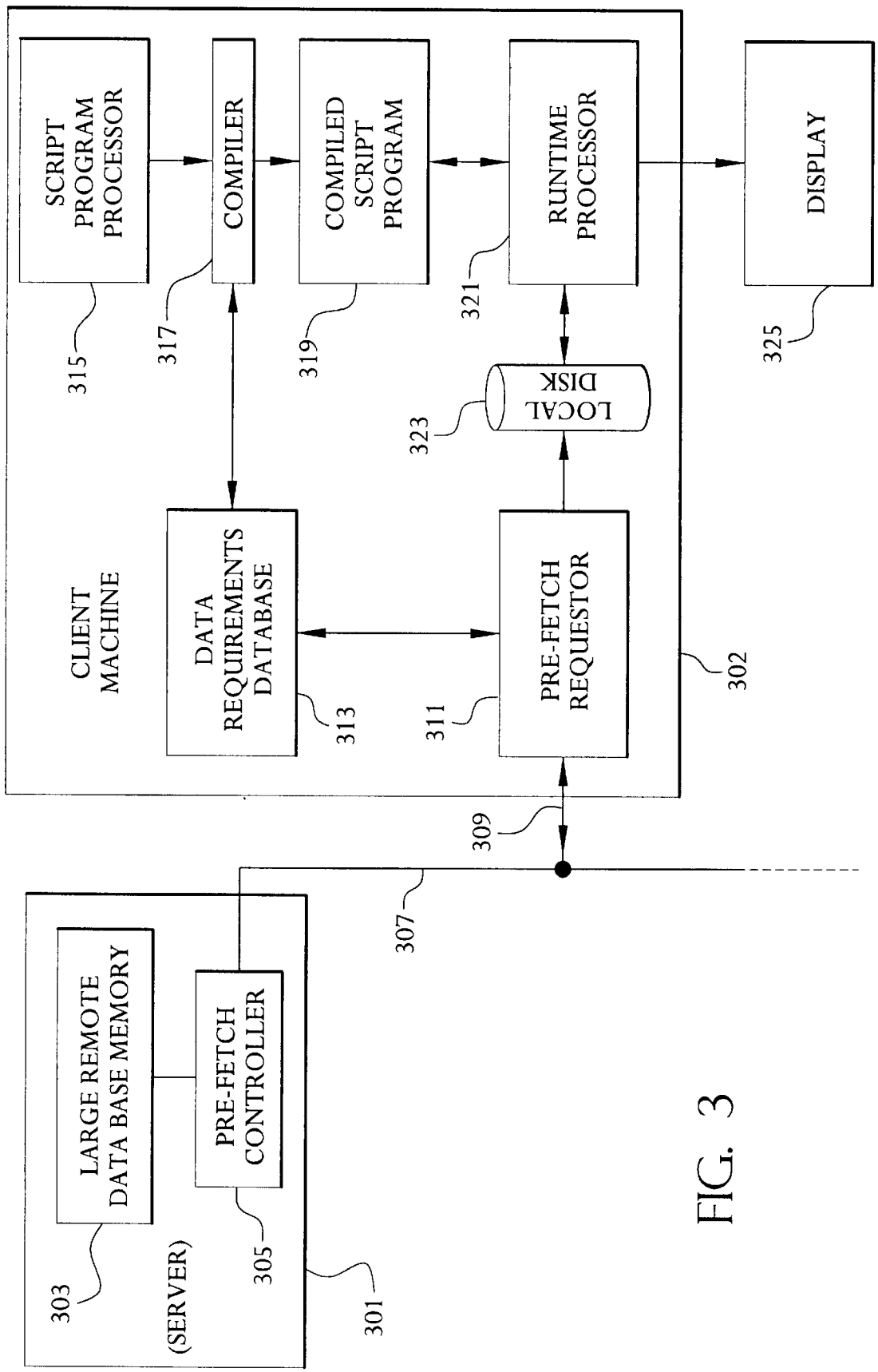
FIG. 3 is a block diagram representation of a preferred architecture for implementing the method of the instant invention.

A preferred architecture for implementing the technique of the instant invention is depicted in FIG. 3. Therein, server 301 comprising a large remote database memory 303 and a prefetch controller 305 is connected for two-way communication to a limited-memory client machine 302 (one of many such clients) via data channel 307 and data channel client connection 309. Pre-fetch requester 311 receives input from data requirements database 313 corresponding to the potentially-needed "next nodes" of data choices (as described above with reference to FIG. 2). The pre-fetch requester then signals the server's pre-fetch controller to transmit the potentially-needed parts of next nodes of data immediately. Upon receipt of this data from the server, the prefetch requestor 311 directs the data to be temporarily stored in local disk 323.

The multimedia script is compiled by the compiler and generates two things: the compiled script program and the data requirements database (313). At a later time, the compiled script program is executed by a runtime processor (321) which executes the instructions from the compiled script, makes data requests, interacts with the user, and generates the desired output to display device 325.

The key to efficient operation of this system is the compiler program contained in compiler 317. This program analyses the script program, at compile time, to determine what data is potentially needed next. This program controls the entire prefetch system. Those who are skilled in the art of drafting such programs will be able to prepare a suitable corresponding compiler program as a simple matter of programming for whatever particular type of client machine is used. The resultant codes will differ, but the basic concept of the invention will be equivalent.

The foregoing description refers to a preferred embodiment of Applicant's invention. The scope of the instant invention is not limited to this embodiment, but rather is defined by the appended claims and equivalents thereof.

What is claimed is:

1. A method of prefetching data, comprising the steps of:
   (a) running a script program on a computer, wherein:
      the program corresponds to a decision tree having a plurality of nodes;
      the program while running on the computer at any given time is at a current node and may branch to a plurality of next nodes, each node having particular potential data requirements; and
      the data potentially required by each node of the decision tree is stored in a remote data storage device that is remote to the computer; and
   (b) during the running of said program when the program is at the current node, prefetching next node data potentially required by the program based on predetermined expected data requirements generated during compilation of the program, wherein the step of prefetching comprises the steps of:
      (1) requesting the remote data storage device to transmit to the computer the next node data for each of the plurality of next nodes; and
      (2) storing the next node data in the computer.

2. The method of claim 1, wherein the predetermined expected data requirements are based on a hierarchy of the predetermined expected data requirements.

3. The method of claim 1, further comprising the step of:
   compiling the program to generate the predetermined expected data requirements.

4. A computer-readable medium having stored therein a plurality of instructions which, when executed by a processor, cause the processor to perform the steps of:
   (a) running a script program on a computer, wherein:
      the program corresponds to a decision tree having a plurality of nodes;
      the program while running on the computer at any given time is at a current node and may branch to a plurality of next nodes, each node having particular potential data requirements; and
      the data potentially required by each node of the decision tree is stored in a remote data storage device that is remote to the computer; and
   (b) during the running of said program when the program is at the current node, prefetching next node data potentially required by the program based on predetermined expected data requirements generated during compilation of the program, wherein the step of prefetching comprises the steps of:
      (1) requesting the remote data storage device to transmit to the computer the next node data for each of the plurality of next nodes; and
      (2) storing the next node data in the computer.

5. The medium of claim 4, wherein the predetermined expected data requirements are based on a hierarchy of the predetermined expected data requirements.

6. The medium of claim 4, wherein the plurality of instructions further causes the processor to perform the step of:
   compiling the program to generate the predetermined expected data requirements.

7. A method for compiling a program runnable on a computer, comprising the steps of:
   (a) receiving a script program, wherein:
      the script program corresponds to a decision tree having a plurality of nodes;
      the script program while running on the computer at any given time is at a current node and may branch to a plurality of next nodes, each node having particular potential data requirements; and
      the data potentially required by each node of the decision tree is stored in a remote data storage device that is remote to the computer;
   (b) generating a compiled, executable program;
   (c) analyzing the script program to determine the next node data requirements for each node of the program; and
   (d) generating, in accordance with said analysis, a database having the predetermined expected data requirements of the compiled, executable script program.

8. The method of claim 7, further comprising the step of prefetching potentially required data during execution of the compiled, executable computer program based on the predetermined expected data requirements.

9. The method of claim 7, wherein the predetermined, expected data requirements are based on a hierarchy of the predetermined expected data requirements.

10. The method of claim 8, wherein the potentially required data is prefetched from a remote data storage device and stored in memory in the computer.

11. The method of claim 7, further comprising the step of storing the predetermined expected data requirements in the computer.

12. A computer-readable medium having stored therein a plurality of instructions which, when executed by a processor, cause the processor to perform the steps of:
(a) receiving a script program runnable on a computer, wherein:
the script program corresponds to a decision tree having a plurality of nodes;
the script program while running on the computer at any given time is at a current node and may branch to a plurality of next nodes, each node having particular potential data requirements; and
the data potentially required by each node of the decision tree is stored in a remote data storage device that is remote to the computer;
(b) generating a compiled, executable program;
(c) analyzing the script program to determine the next node data requirements for each node of the program; and
(d) generating, in accordance with said analysis, a database having the predetermined expected data requirements of the compiled, executable script program.

13. The medium of claim 12, wherein the plurality of instructions further causes the processor to perform the step of:
prefetching potentially required data during execution of the compiled, executable computer program based on the predetermined expected data requirements.

14. The medium of claim 12, wherein the predetermined, expected data requirements are based on a hierarchy of the predetermined expected data requirements.

15. The medium of claim 13, wherein the potentially required data is prefetched from a remote data storage device and stored in memory in the computer.

16. The storage medium of claim 12, wherein the plurality of instructions further causes the processor to perform the step of:
storing the predetermined expected data requirements in the computer.

17. A computer system, comprising:
(a) a processor; and
(b) a memory coupled to the processor, wherein the memory stores a sequence of instructions which, when executed by the processor, causes the processor to perform the steps of:
(1) running a script program on a computer, wherein:
the program corresponds to a decision tree having a plurality of nodes;
the program while running on the computer at any given time is at a current node and may branch to a plurality of next nodes, each node having particular potential data requirements; and
the data potentially required by each node of the decision tree is stored in a remote data storage device that is remote to the computer; and
(2) during the running of said program when the program is at the current node, prefetching next node data potentially required by the program based on predetermined expected data requirements generated during compilation of the program, wherein the step of prefetching comprises the steps of:
requesting the remote data storage device to transmit to the computer the next node data for each of the plurality of next nodes; and
storing the next node data in the computer.

18. The computer system of claim 17, wherein the predetermined expected data requirements are based on a hierarchy of the predetermined expected data requirements.

19. The computer system of claim 17, wherein the sequence of instructions further causes the processor to perform the step of:
compiling the program to generate the predetermined expected data requirements.

20. A method, comprising the steps of:
(a) running a program on a computer, wherein:
the program corresponds to a decision tree having a plurality of nodes, each node having particular potential data requirements;
the program while running on the computer at any given time is at a current node and may branch to a plurality of next nodes; and
the data potentially required by each node of the decision tree is stored in a remote data storage device that is remote to the computer; and
(b) during the running of said program, prefetching next node data potentially required by the plurality of next nodes based on predetermined expected data requirements generated during compilation of the program, wherein:
the step of prefetching comprises the steps of:
(1) requesting the remote data storage device to transmit to the computer the next node data; and
(2) storing the next node data in the computer.

21. A computer system, comprising:
a processor; and
a memory coupled to the processor, wherein the memory stores a sequence of instructions which, when executed by the processor, causes the processor to perform the steps of:
(a) running a program on a computer, wherein:
the program corresponds to a decision tree having a plurality of nodes, each node having particular potential data requirements;
the program while running on the computer at any given time is at a current node and may branch to a plurality of next nodes; and
the data potentially required by each node of the decision tree is stored in a remote data storage device that is remote to the computer; and
(b) during the running of said program, prefetching next node data potentially required by the plurality of next nodes based on predetermined expected data requirements generated during compilation of the program, wherein:
the step of prefetching comprises the steps of:
(1) requesting the remote data storage device to transmit to the computer the next node data; and
(2) storing the next node data in the computer.

* * * * *